CHRISTOPHER JOHN LAKE (NAME CHANGED FROM JOHN CHRISTOPHER LAKE BY JUDICIAL ORDER).
LOCOMOTION FOR VESSELS, VEHICLES, OR OTHER MOVING BODIES OR OBJECTS.
APPLICATION FILED MAY 22, 1907.
915,972.
Patented Mar. 23, 1909.
2 SHEETS—SHEET 1.
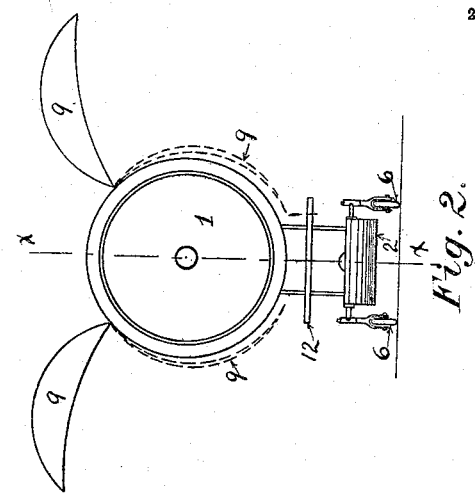
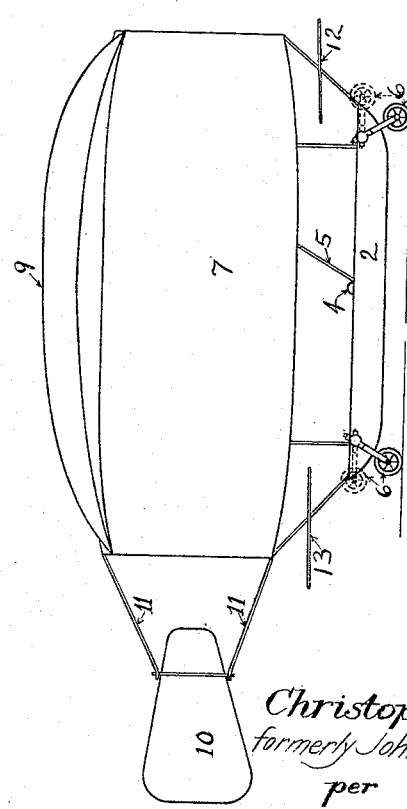
Witnesses
W. A. Simonds
C. C. Jones.
INVENTOR
Christopher John Lake,
formerly John Christopher Lake.
per
Spencer Heath,
Attorney

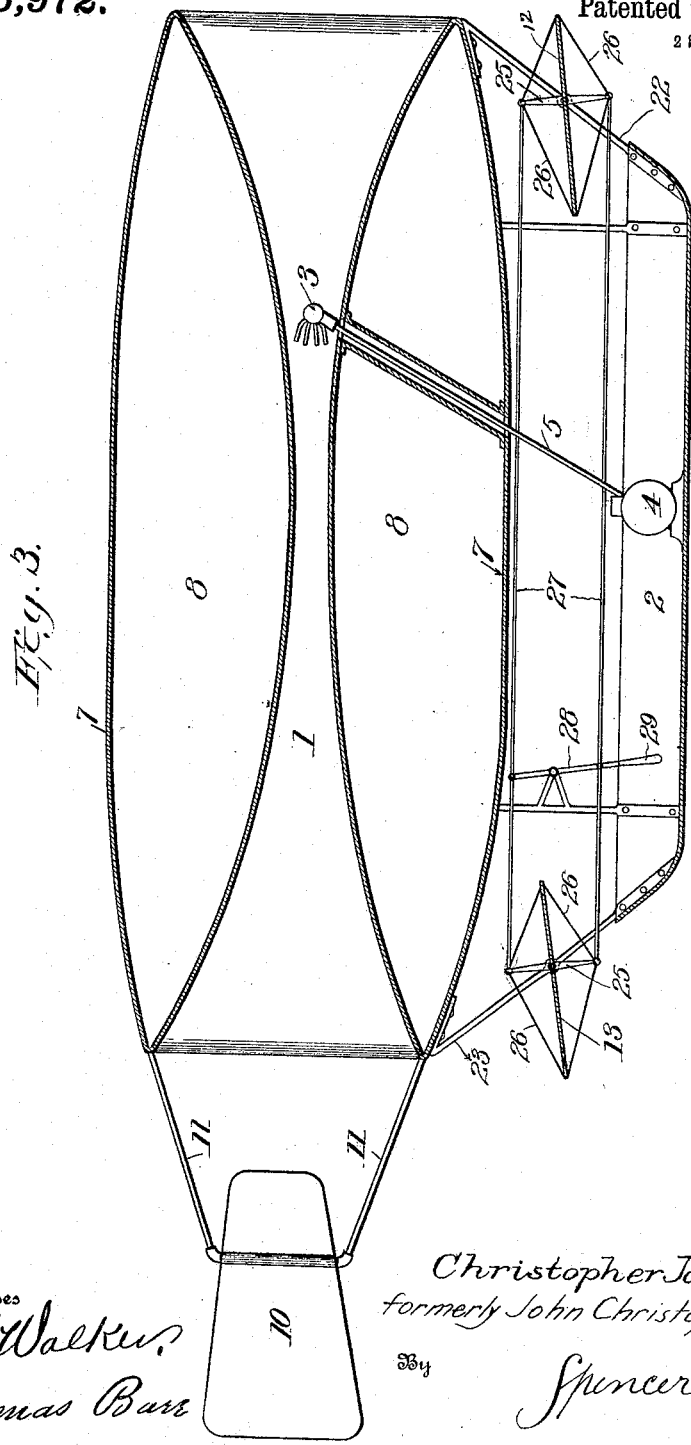

UNITED STATES PATENT OFFICE.

CHRISTOPHER JOHN LAKE, (NAME CHANGED FROM JOHN CHRISTOPHER LAKE BY JUDICIAL ORDER,) OF BRIDGEPORT, CONNECTICUT.

LOCOMOTION FOR VESSELS, VEHICLES, OR OTHER MOVING BODIES OR OBJECTS.

No. 915,972.     Specification of Letters Patent.     Patented March 23, 1909.

Application filed May 22, 1907. Serial No. 374,996.

*To all whom it may concern:*

Be it known that I, CHRISTOPHER JOHN LAKE, (formerly JOHN CHRISTOPHER LAKE,) a citizen of the United States, and resident of Bridgeport, in the county of Fairfield and State of Connecticut, have invented certain new and useful Improvements in Locomotion for Vessels, of which the following is a specification.

The main object of my invention is to provide a simple and efficient means for applying heat energy generated within a movable body or structure so as to cause and maintain locomotion thereof, together with suitable means for supporting or sustaining the said body or structure while in motion on either land, water or in the atmosphere. It is my intention to use wheels for land travel or runners for ice and snow, a boat-like hull or body for water navigation, and balloons, wings or aeroplanes or combinations thereof for aerial navigation.

My invention consists of: First: a means for causing locomotion in land, water or aerial vehicles by exhausting the atmosphere from in front of the vehicle and expelling it at the rear, thereby creating a partial vacuum in front and an increase of pressure at the rear of the vehicle. Second: a shell or passage attached to the vehicle and provided with means for drawing air into one end and expelling it at the other for the purpose of propelling the vehicle or sustaining it against opposing forces. Third: a suitable vehicle for applying my means of locomotion either on land or water or in the air, by means of wheels, a boat-like hull or body, or by wings, planes or balloons or by combination of any or all of the several means named.

The drawings show my means of locomotion as applied to land, water and aerial travel, and the vehicle may be so constructed as to adapt it to any one or two or all three of these modes of travel.

Figure 1 is an outside side view. Fig. 2 is an outside end view. Fig. 3 is a longitudinal section drawn to larger scale and showing the manner in which the rudders are connected and operated together.

Similar numerals refer to similar parts in the several figures.

1, is a centrally contracted passage attached to the body of the vehicle 2 and having a projector 3 for expelling rearwardly within the passage a heated elastic fluid produced under pressure in the generator 4, and conducted to the projector through the pipe 5.

The generator 4 may be of any suitable type or variety to produce a heated pressure fluid but I prefer to employ a special design of generator which produces a composite power fluid consisting of hydrocarbon gas, water vapor and highly heated air, the two latter elements being brought to a high degree of heat and pressure in a chamber surrounding an inner cylinder in which the hydrocarbon gas is produced by explosions and being mingled with that gas as the product of the generator. It is obvious, however, that a steam boiler, compressed air tank or any other known source of energy may be substituted within the spirit of my invention.

2, is the hull or body of the vehicle containing the power generator, the necessary controlling and operating mechanism and passenger space. This body may be of boat-like form as shown and may be fitted with wheels 6, which may be folded as shown by the dotted lines in Fig. 1, or detached when not required for land travel.

7, represents a cylindrical fabric attached to the ends of the centrally contracted passage 1, and forming the annular space 8, which may be filled with gas or rarefied air to produce buoyancy in the atmosphere, the arrangement of this gas space around the centrally contracted passage being such that the walls of the passage are insulated from the outer air and the heat from the elastic fluid passing through the walls of the passage is not lost but serves to raise the temperature of the contained air or gas, thereby increasing its buoyancy.

9, represents wings or planes attached to the main structure and provided with mechanism not shown whereby they may be controlled during flight and folded in the position shown by the dotted lines in Fig. 2 when not in use.

10, is a vertical rudder supported in brackets 11 for controlling the vehicle in lateral directions, while the forward and aft horizontal rudders 12 and 13 give vertical control. A special feature that I desire to claim for these horizontal rudders is that they may be used in conjunction so as to keep the vehicle stable and horizontal whether ascending or descending. The means whereby I accomplish this result are illustrated in Fig. 3. The rudders are pivoted on the members 22 and 23 which form part of the framework of the vehicle. Each rudder is provided with a cross-arm 25 rigidly secured by stays 26. The extremities of the cross-arms are connected by parallel cords or wires 27 in such manner that the angular position of the two rudders will always be the same. The position of the rudders is varied and controlled by the lever 28 which is pivoted to the frame of the vehicle in the same manner as the cross-arms on the rudders and which extends into the car to form a tiller 29, in a position convenient for manual operation. When it is desired to ascend it is not necessary to tilt the vehicle by shifting ballast or by other means. The two rudders are slanted upward by moving the tiller forward. This causes an upward component of air pressure approximately equal at both ends of the vehicle which, therefore, rises without tilting or inclination. For descending, the tiller is moved in the reverse direction and with the opposite effect, as is clearly obvious from the drawing.

The central and most essential feature of my invention is my means of producing locomotion by expelling heated gas or elastic fluid rearwardly into the centrally contracted passage-way 1, thereby inducing a current of atmosphere through the said passage from front to rear. In this there are several valuable features hitherto unknown to any method of propulsion: In all previous methods it has been necessary to push or drive the vessel or vehicle into and against the resisting medium. This has been accomplished by various devices for pushing the medium backward from the vessel or vehicle, thereby causing only such forward tendency as would result from the reaction due to the inertia of the medium pushed backward and at the same time causing a tendency toward a vacuum sternward and an increase of pressure at the bow, both of which conditions are inimical to the speed and progress of the vessel. In my method of locomotion the elastic fluid from the projector is so directed rearwardly in the centrally contracted passage that it draws the air from in front of the machine, thereby relieving the excessive pressure that otherwise would there exist and tending to create a vacuum rather than a pressure in the direction of progress. The air thus removed from in front of the machine is mingled with and heated by the escaping elastic fluid and the whole is discharged at the after extremity in greatly expanded volume, thus securing the well-known advantage of a large projected stream and tending to cause a condition of pressure rather than vacuum at the after end.

I am aware that it is old to use a jet of elastic fluid for propulsion and it is also old to use a current of air through a passage for that purpose. I have extended the prior art by utilizing the joint action of the fluid jet and air current, so that each is of special advantage to the other. The air current forms a continuous vane or piston, as it were, to receive the mechanical impact of the jet and the discharged fluid heats and expands the air current as it passes through the passage. These are important features for it is well known that the efficiency of propulsion increases with the size of the current discharged, and that a jet projected in "dead" or "slack" air at the rear of the vessel is of comparatively small value. In my invention "live" air is drawn in from in front of the vessel and concentrated in the central portion of the passage to intimate contact with the heated fluid which augments and expands the volume of air into the most efficient sternward stream. These advantages are secured in highly effective degree owing to the peculiar form of the propelling passage and the special location therein of the multiple nozzle or projector 3 within the passage and somewhat forward of its most contracted portion. The air to be used for propulsion is collected in the forwardly expanding portion of the passage, whence it is concentrated and driven with impulsive energy through the central portion. Here the air and heated fluid are brought into intimate mixture and the heat of the fluid transferred to the air with the result of great expansion thereof during its traverse of the rearwardly expanding portion of the passage. It will thus be perceived that the air does not expand in all directions against the atmosphere without effect upon the vessel, but expands against the rearward diverging walls of the passage on one side and the inert atmosphere on the other. In this way, the expansive energy of the fluid is utilized for forward propulsion instead of being lost into the atmosphere after leaving the vessel, as occurs in other modes of fluid propulsion. In order to secure a large volume, the energy of the pressure fluid is transferred to a body of air. Now, since this air must be drawn from somewhere, it is highly advantageous to draw it from in front of the vessel, this being a point at which air accumulates and from which it must otherwise be thrust aside at the expense of propulsive energy. Being drawn from this point and impulsed into a constricted passage, opportunity is afforded to increase the volume of air by mingling with it a heated fluid having kinetic or mechanical energy. The fluid being heated, the air absorbs its thermal as well as its mechanical energy and in expanding converts the former into mechanical effect. The heated fluid being used to produce the air current, a high economy results from the fact that whereas not all of its energy can be imparted by mechanical impulse to the air, the remainder is not lost but serves to heat the air which, in turn, converts the heat into further mechanical effect as it expands in the passage, on the same principle as the expanding or diverging nozzles used in connection with steam turbines. The air is, in effect, a continuous vane or piston receiving the impact of the fluid, but unlike a solid piston, it is capable of giving up again directly in mechanical form the heat energy which it receives from the fluid as well as of absorbing the mechanical impact supplied thereby. There are two kinds of work performed by the fluid; first, the direct mechanical effect of impulse and suction of air from in front, and second, the thermal effect which becomes converted into mechanical effect with accompanying drop in temperature by expansion of the issuing air. The measure of this thermal effect is the difference between the quantity of heat which a given portion of air contains after access of heat from the fluid and that quantity which it contains as it issues from the passage, and the greater the "drop" in the heat units occurring within the structure (accompanied by expansion), the greater the thermal efficiency. It will thus be seen that there is engrafted upon a mechanically operating device all the conditions for producing a heat engine cycle or, rather, a continuous succession of them, the efficiency of which is measured by the ratio between the amount of heat delivered to the apparatus and the quantity that is utilized effectively for expansion of the air.

A radical departure from the present practice in balloon construction lies in the form of the gas space surrounding the central passage. In nearly all dirigible balloons as now constructed, the air resistance is sought to be minimized by tapering the gas bag from a relatively large diameter in its central portion to approximate points at the front and rear ends. In connection with my method of propulsion the diameter of the gas bag is approximately the same throughout its length, the taper being interior instead of exterior, so that the bag tapers to a circular ring instead of a point as in the usual practice.

Having described my invention, I claim:

1. In a vessel or vehicle, the combination with a passage or conduit having a contracted central portion and expanding forwardly and rearwardly therefrom to enlarged open ends, of means for producing a heated elastic fluid under pressure and means for discharging said fluid rearwardly from a point intermediate the forward end of the conduit and its contracted central portion in such manner as to impel air therethrough, the air being heated and expanded by said fluid during its traverse of the rearwardly expanding portion of the conduit.

2. In a vessel or vehicle, the combination with a passage or conduit having a contracted central portion and expanding forwardly and rearwardly therefrom to enlarged open ends, of means for producing a heated elastic fluid under pressure, means for discharging said fluid rearwardly from a point intermediate the forward end of the conduit and its contracted central portion in such manner as to impel air therethrough, the air being heated and expanded by said fluid during its traverse of the rearwardly expanding portion of the conduit, and an insulating air or gas bag surrounding the conduit to reduce the radiation of heat therefrom.

3. In a vessel or vehicle, the combination with a tubular balloon of a passage or conduit having a contracted central portion and expanding forwardly and rearwardly therefrom to enlarged open ends, means for producing a heated elastic fluid under pressure and means for discharging said fluid rearwardly from a point intermediate the forward end of the conduit and its contracted central portion in such manner as to impel air therethrough, the air being heated and expanded by said fluid during its traverse of the rearwardly expanding portion of the conduit, said conduit forming the interior walls of said tubular balloon and serving to aid in maintaining the warmth of the balloon contents.

4. A vessel or vehicle comprising a car or body, a balloon or gas bag, a propelling device surrounded thereby, said propelling device consisting in a passage or conduit having a contracted central portion, enlarged expanding ends and having means for discharging a heated pressure fluid rearwardly from the forward part of the conduit into its contracted portion so as to impel air therethrough and expand the air in its traverse of the after expanding portion of the conduit, a vertical rudder for steering the vessel and horizontal rudders situated in the forward and after portions of the vessel and provided with means for operating them in constant parallelism together.

CHRISTOPHER JOHN LAKE.
(Formerly JOHN CHRISTOPHER LAKE.)

Witnesses:
L. R. LORNE,
THOMAS LIVINGSTON.